(12) United States Patent
McAllister et al.

(10) Patent No.: US 6,305,646 B1
(45) Date of Patent: Oct. 23, 2001

(54) ECCENTRICITY CONTROL STRATEGY FOR INCLINED GEOSYNCHRONOUS ORBITS

(75) Inventors: Jeoffrey R. McAllister, Redondo Beach; Richard A. Fowell, Culver City, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/468,701

(22) Filed: Dec. 21, 1999

(51) Int. Cl.[7] .............. B64G 1/00; B64G 1/22; G01G 7/78; G01C 21/00; G05D 1/00; G05D 3/00; G06F 17/00; G06F 7/00
(52) U.S. Cl. .............. 244/158 R; 701/226; 701/13
(58) Field of Search .............. 244/158 R; 701/226, 701/13

(56) References Cited

U.S. PATENT DOCUMENTS

| | | | |
|---|---|---|---|
| 4,827,421 | * 5/1989 | Dondl | 364/459 |
| 4,854,527 | * 8/1989 | Draim | 244/158 R |
| 5,120,007 | * 6/1992 | Pocha et al. | 244/158 R |
| 5,124,925 | * 6/1992 | Gamble et al. | 364/459 |
| 5,326,054 | * 7/1994 | Turner | 244/158 R |
| 5,553,816 | * 9/1996 | Perrotta | 244/158 R |
| 5,568,904 | * 10/1996 | Brock et al. | 244/158 R |
| 5,669,585 | * 9/1997 | Castiel et al. | 244/158 R |

\* cited by examiner

*Primary Examiner*—Charles T. Jordan
*Assistant Examiner*—Christian M. Best
(74) *Attorney, Agent, or Firm*—Gates & Cooper LLP (57) ABSTRACT

A method, apparatus, article of manufacture, and a memory structure for controlling the eccentricity of an orbit. One embodiment of the present invention is described by a method comprising the step of performing a program of eccentricity control maneuvers wherein the control maneuvers are executed at times and in directions selected to apply substantially all eccentricity control along a line of antinodes. In one embodiment, the control maneuvers arc tangential maneuvers, and each control maneuver is applied near the line of antinodes. Provision is made for performing additional maneuvers, including node retargeting maneuvers during specified intervals. Another embodiment of the invention is described by a satellite in a substantially geosynchronous orbit having a satellite control system with a processor implementing instructions to perform control maneuvers as described above. Yet another embodiment of the present invention is described by a command facility comprising a processor for implementing instructions to perform the program control maneuvers described above, and a communicatively coupled transmitter for transmitting the commands to the satellite.

23 Claims, 12 Drawing Sheets

ECCENTRICITY CONTROL STRATEGY FOR INCLINED GEOSYNCHRONOUS ORBITS

BACKGROUND OF THE INVENTION

1. Field of the Invention

The present invention relates to systems and methods of stationkeeping satellite orbits, and in particular to a method and system for controlling eccentricity in inclined geosynchronous orbits.

2. Description of the Related Art

Over the past several decades, there has been a dramatic increase in the number of satellites in orbit. These satellites are maintained in different orbits, which are selected to allow the satellite to perform its intended mission.

Geostationary satellite orbits are highly valued, because they allow the satellite to remain in a fixed apparent location from a reference on the earth's surface. When satellites are placed in such orbits, the ground stations can direct the transceiving antenna at a fixed direction.

Figure 1A:
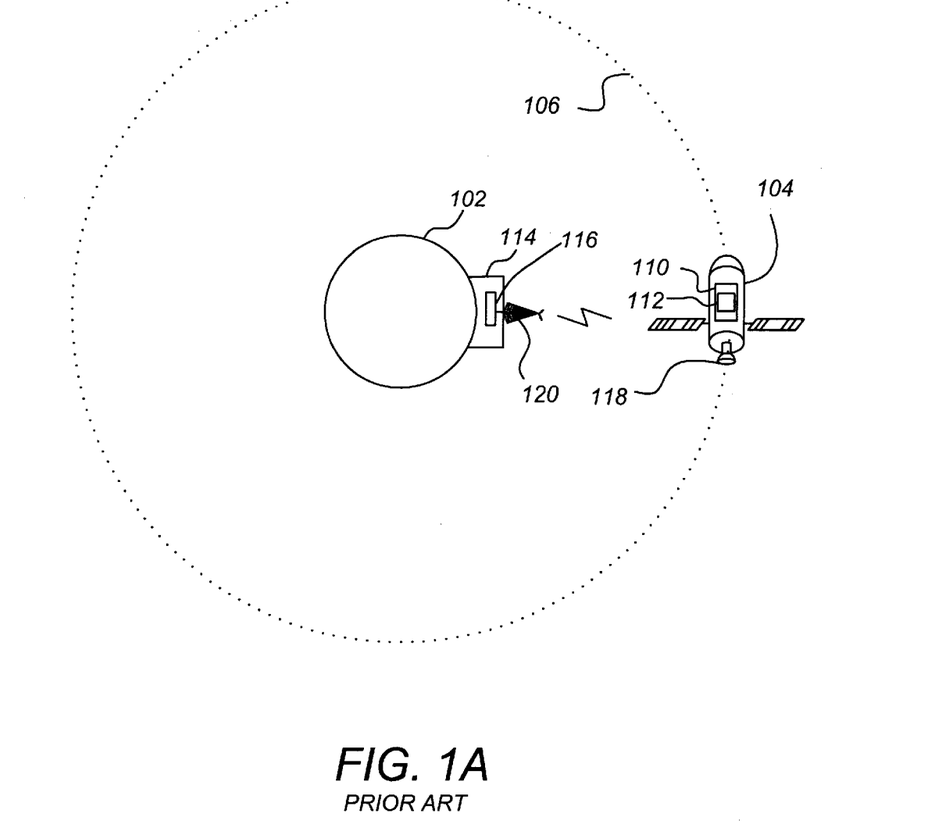
FIG. 1A is a diagram of a satellite disposed in an orbit around the earth.

FIG. 1A is a diagram of a satellite 104 disposed in an orbit 106 around the earth 102. The satellite 104 is maintained in the desired orbit 106 by performing stationkeeping satellite maneuvers. These maneuvers can be performed autonomously by the satellite 104 itself using a satellite control system 110 having one or more thrusters 118 and one or more satellite processors 112 implementing one or more instructions for commanding the thrusters 118 to perform stationkeeping maneuvers. Alternatively or in addition to the autonomous stationkeeping technique, a command facility 114 having a command facility processor 116 communicatively coupled to a transmitter 120 can generate and transmit stationkeeping commands to the satellite 104. Although illustrated as a ground-based command facility, the stationkeeping commands may be transmitted from another spacecraft as well.

Figure 1B:
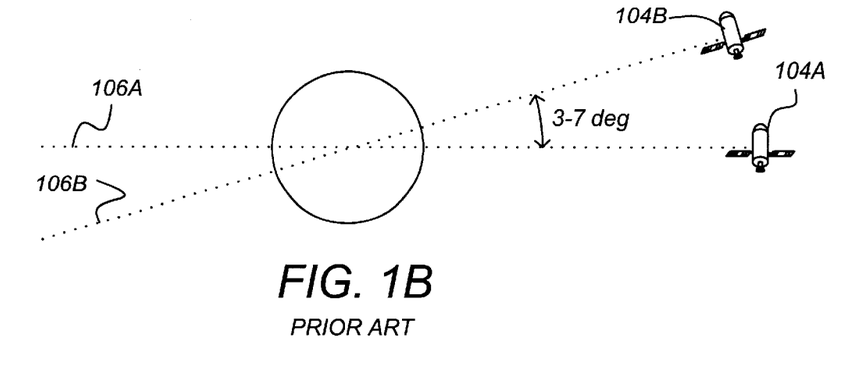
FIG. 1B is a diagram of a satellite in a geostationary orbit.

FIG. 1B is a diagram showing a first satellite 104A in a geostationary orbit 106A. Due to satellite-to-satellite communication interference issues, satellites in such geostationary orbits 106A are assigned to geostationary "slots" that are 0.2 degrees wide (±0.1 degree about the nominal longitude). These satellites must remain within the assigned slot.

FIG. 1B also depicts a second satellite 104B in a geosynchronous orbit 106B. Geosynchronous orbits, which are often used for communications to mobile customers (such as with "GEOMOBILE" satellites) are similar to those of geostationary orbits, except, they have a non-zero inclination typically in the range of three to seven degrees.

Figure 2:
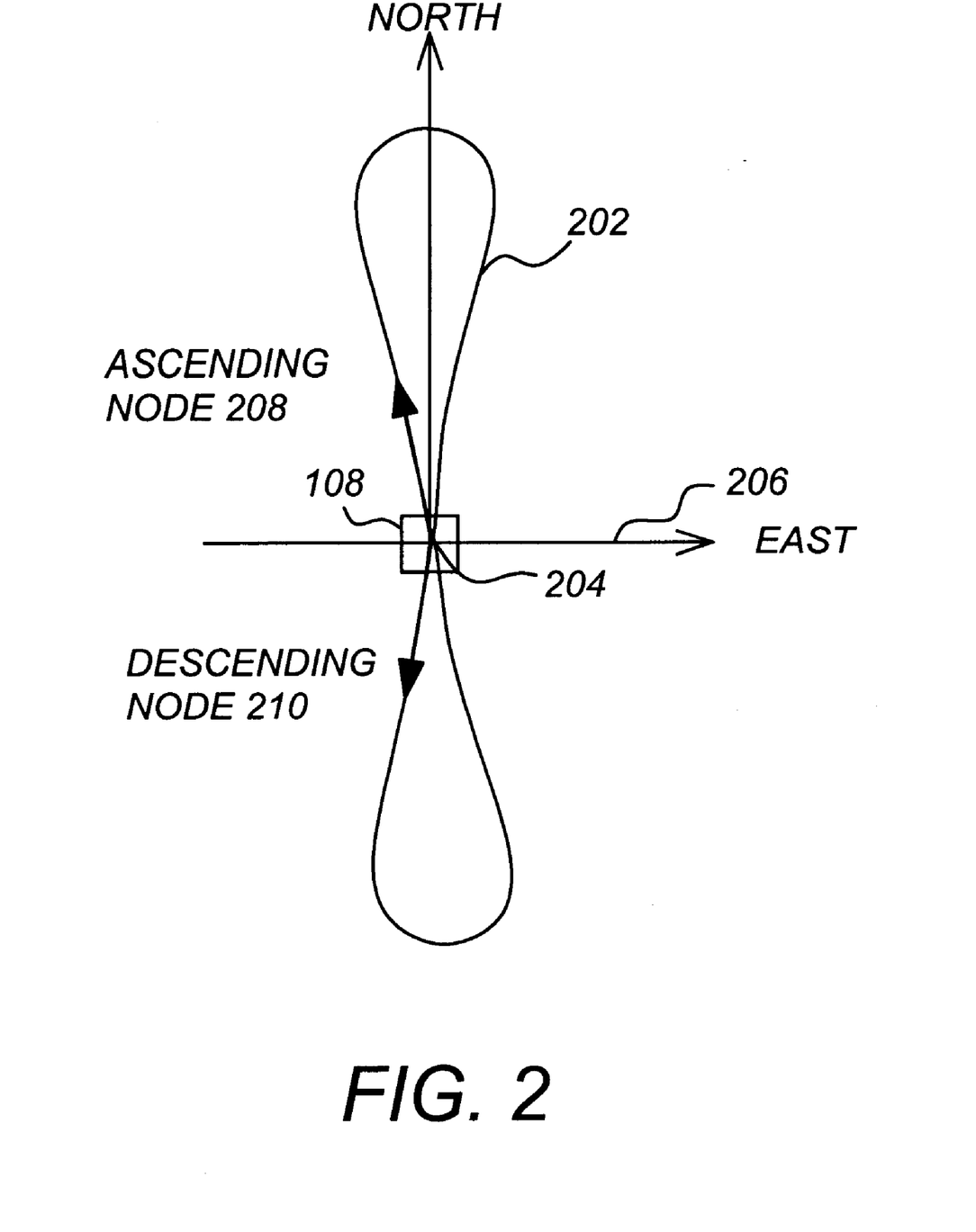
FIG. 2 is a diagram depicting a ground track of a typical geostationary orbit.

FIG. 2 is a diagram depicting the ground track 202 of a typical geosynchronous orbit 106B. The center 204 of the "figure-8" depicted by the ground track 202 is at the equatorial plane of the earth 102. The satellite 104B passes through the ground track center 204 twice each day, once at the ascending node 208 and once at the descending node 210. The motion is more complex in practice, due to orbit eccentricity, drift and perturbing forces. Despite the satellite 104B motion, interference is still a problem, and the satellite 104B is therefore still constrained to the ±0.1 degree slot near the equatorial plane. The geosynchronous satellite 104B cannot stay inside the ±0.1 degree slot all of the time (the width of the ground track itself exceeds the ±0.1 degree window by itself when the orbital inclination exceeds about 4.8 degrees).

This problem is especially critical for current and future generation spacecraft. Such spacecraft often have large solar arrays and solar collectors, and therefore receive a strong solar force. This solar force produces a large steady state eccentricity when a single burn sun-synchronous perigee stationkeeping strategy is used. This eccentricity is difficult to control efficiently, even when a sun facing perigee stationkeeping strategy (which compresses eccentricity using drift control maneuvers) is used to conserve fuel. In some satellites, the east/west longitude excursion due to eccentricity can take up more than half the width of the slot. Other factors also consume slot 108 width, including drift over the maneuver cycle, maneuver execution error, bipropellant momentum dumping disturbances, orbit determination error, and orbit propagation error. A discussion of these contributors is presented in "The Operation and Service of Koreasat-1 in Inclined Orbit," AIAA paper 98-1352, which reference is incorporated by reference herein. Hence, closer control of the excursion due to eccentricity is required.

There are many possible solutions to this problem. One is to introduce a maneuver scheduler, allowing drift maneuvers to be performed daily. This solution would require more complicated satellite processing. Further, this solution would be difficult to implement for satellites already on-orbit, and would only be helpful at "high-drift" longitudes.

Another possible solution is to use a "two-maneuver" satellite maneuver scheme which performs burns in both tangential directions to maintain tighter control over the eccentricity. However, this solution requires more propellant, additional thrusters, and raises issues of additional plume impingement.

Another potential solution is to implement an axial firing mode in which radial $\Delta V$ is used to control eccentricity. This solution uses roughly twice the fuel of a tangential $\Delta V$ scheme, and would require modified maneuver planning algorithms, and changes to the attitude control system (ACS).

Another potential solution would be to implement a shorter orbital stationkeeping maneuver interval. This would not provide any propellant savings, but would reduce longitudinal drift between maneuvers. However, this is a manual equivalent to the first proposed solution, and the shortened stationkeeping maneuver interval would increase support operations costs.

As is apparent from the foregoing, there is a need for a stationkeeping method for satellites in geosynchronous orbits that provides the necessary longitudinal control near the equatorial plane, without requiring the operational, hardware, or software costs outlined above. The present invention satisfies that need.

SUMMARY OF THE INVENTION

To address the requirements described above, the present invention discloses a method for controlling the eccentricity of an orbit.

One embodiment of the present invention is described by a method comprising the step of performing a program of eccentricity control maneuvers wherein the control maneuvers are executed at times and in directions selected to apply substantially all eccentricity control along a line of antinodes. In one embodiment, the control maneuvers are tangential maneuvers, and each control maneuver is applied near the line of antinodes. Provision is made for performing additional maneuvers, including node retargeting maneuvers during specified intervals. Another embodiment of the invention is described by a satellite in a substantially geosynchronous orbit having a satellite control system with a processor implementing instructions to perform control maneuvers as described above. Yet another embodiment of the present invention is described by a command facility comprising a processor for implementing instructions to perform the program control maneuvers described above, and a communicatively coupled transmitter for transmitting the commands to the satellite.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

As described above, it is critical that satellites in geosynchronous orbits 106B remain within their assigned slot 108 when crossing near the equatorial plane. There are two major sources orbital characteristics that cause a spacecraft to exceed the slot boundaries: drift from triaxial perturbation sources, and eccentricity.

Figure 3:
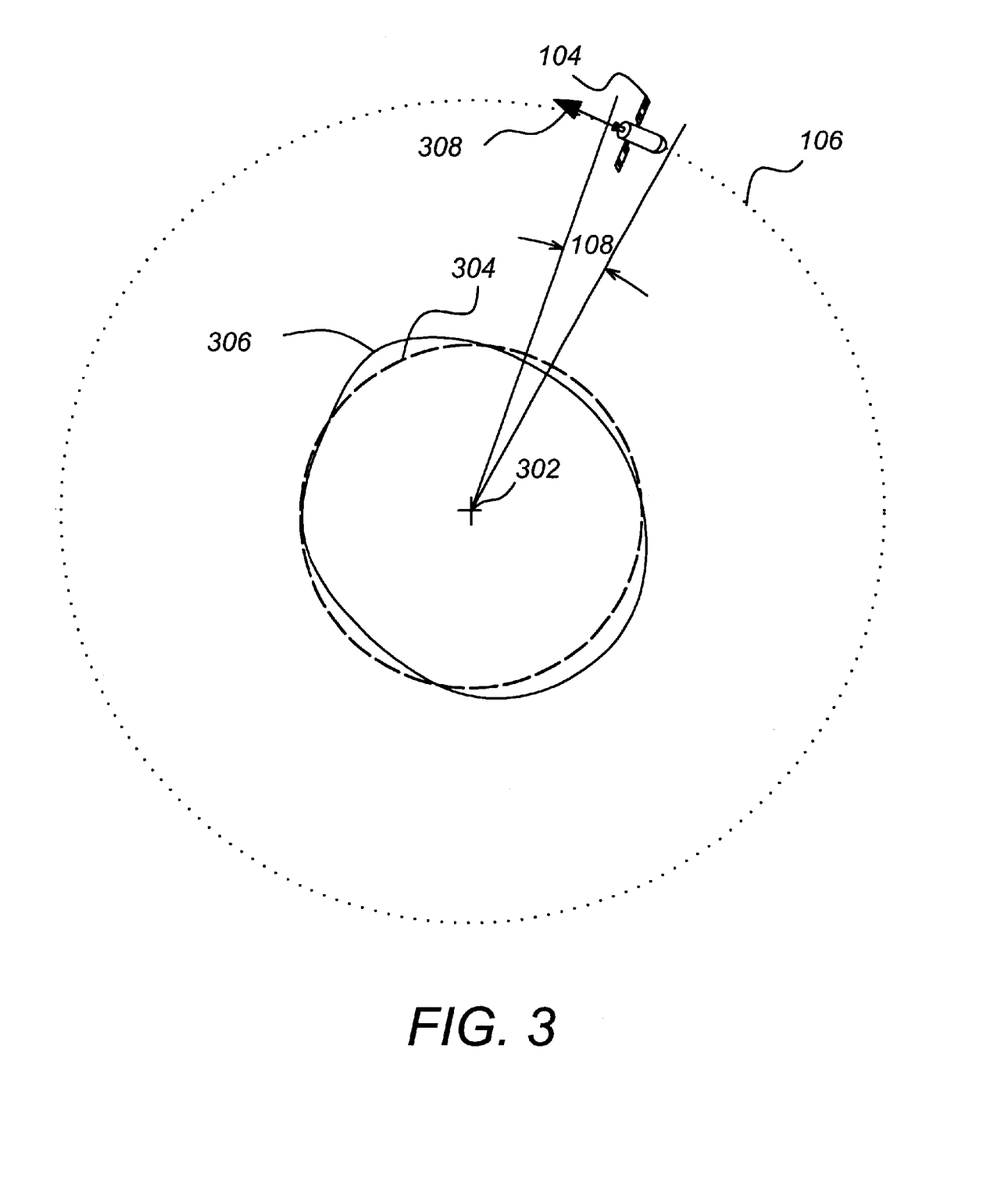
FIG. 3 is a diagram illustrating a source of triaxial drift.

FIG. 3 is a diagram illustrating the source of triaxial drift. Triaxial drift is caused by irregularities in the gravitational field of the earth 102. These are caused by the earth's surface variations and differences in the density of matter near the earth's surface. FIG. 3 depicts the earth 102 viewed from the North Pole 302. The nominal profile 304 of the earth 102 from this view is substantially circular. However, surface and density variations result in an effective profile 306 that is better approximated as elliptical. These irregularities induce a triaxiality perturbation 308 that induces satellite motion. If left uncorrected, these perturbations will allow the satellite to drift from its slot 108.

A second major source of drift is due to the eccentricity of the orbit 106. Although the orbits are ideally circular, sun force perturbations and perturbations from other sources combine to drive initially circular orbits of to elliptical orbits of varying eccentricities.

Figure 4A:
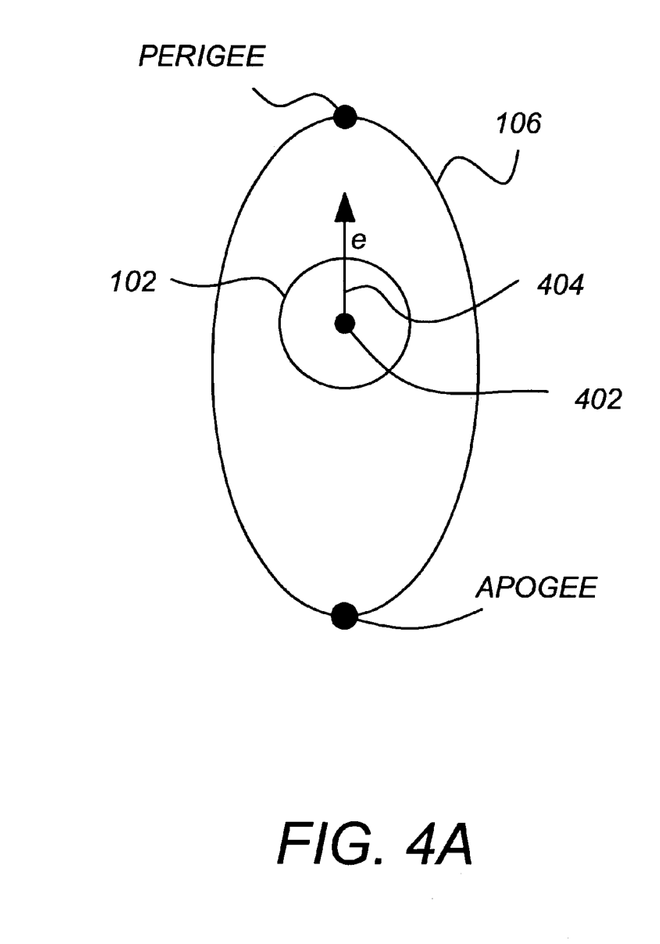
FIG. 4A is a diagram showing an elliptical orbit of a satellite around a gravitational body.

FIG. 4A is a diagram showing an elliptical orbit 106C of a spacecraft around the earth 102 or other gravitational body. An elliptical orbit 106C includes a perigee, in which the orbital speed of the spacecraft is maximum and the distance from the earth 102 is at a minimum, and an apogee in which the orbital speed is at a minimum and the distance from the earth 102 is at a maximum. The elliptical orbit can also be described in terms of an eccentricity vector $\vec{e}$ 404, which has a magnitude proportional to the eccentricity of the orbit and a direction that always points to the perigee.

Figure 4B:
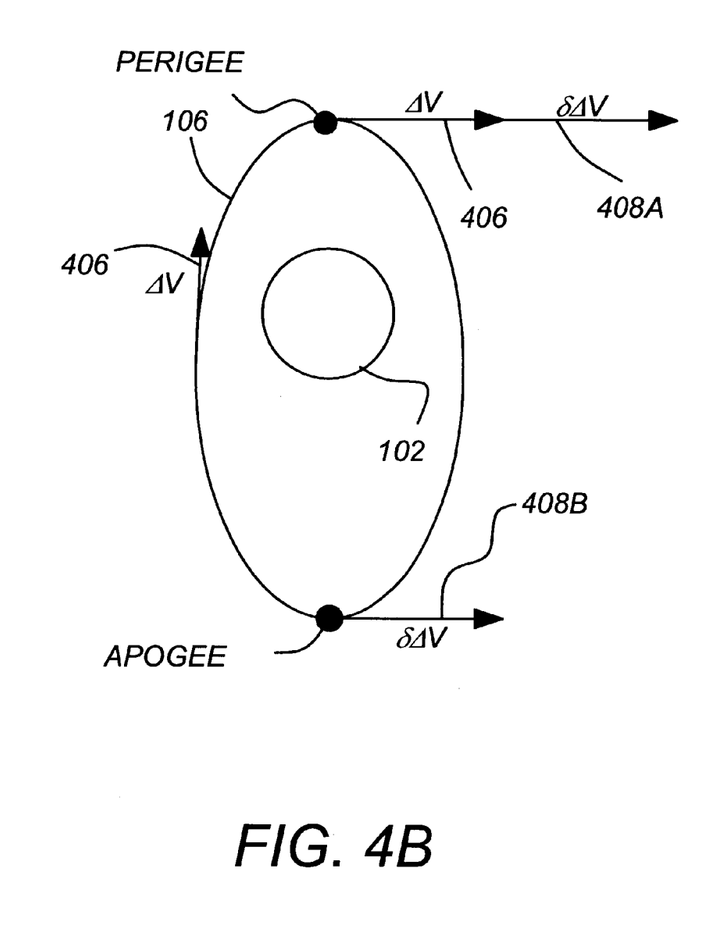
FIG. 4B is a diagram showing a stationkeeping strategy for both drift and eccentricity control.

FIG. 4B is a diagram showing a stationkeeping strategy for both drift and eccentricity control. Retrograde maneuvers (those in the opposite direction from the spacecraft's velocity vector) are an efficient way to counteract drift due to posigrade acceleration (those in the same direction as the spacecraft 104 velocity vector). To account for triaxial drift, retrograde maneuvers (illustrated as $\Delta V$ 406 in FIG. 4B) can be performed at any point in the orbit. However, efficient correction of eccentricity induced from solar perturbation sources, two maneuvers, including a posigrade maneuver at apogee and a retrograde maneuver at perigee are required. These maneuvers are illustrated as $\delta \Delta V$ and as 408A and 408B, respectively in FIG. 4B. To reduce the number of maneuvers required, the drift maneuver $\Delta V$ 406 may be performed at the same time as the first $\delta \Delta V$ maneuver 408A. Even so, second eccentricity maneuver $\delta \Delta V$ 408B must be performed to null out drift components caused by the first eccentricity maneuver $\delta \Delta V$ 408A. Further details regarding this stationkeeping technique can be found in "An Introduction to Mission Design for Geostationary Satellites," by J. J. Pocha, 1987, and U.S. Pat. No. 5,124,925, issued to Gamble et al. for "Method for Controlling East/West Motion of a Geostationary Satellite," both of which are hereby incorporated by reference herein.

The problem with this multiple maneuver technique is that it requires both posigrade and retrograde maneuver capabilities. This requires either posigrade and retrograde thrusters, or a more robust satellite ACS and navigation capability to rotate the spacecraft before the maneuver engine is activated. Since the minimum maneuver required would control drift only, it also requires additional fuel.

Figure 5A:
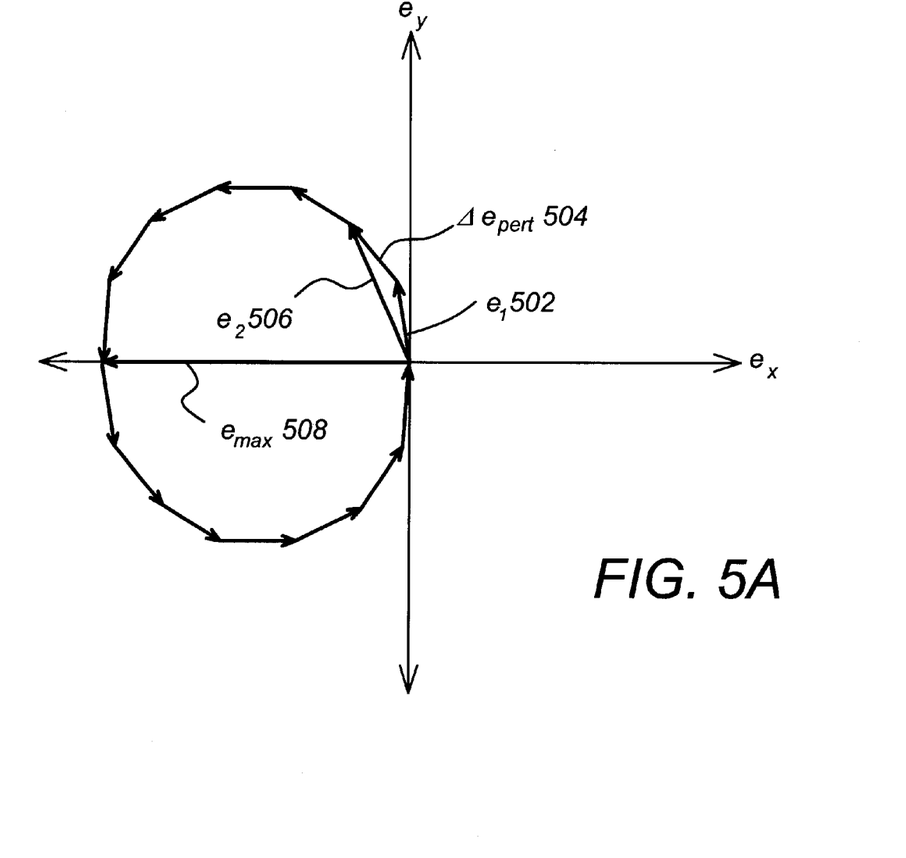
FIG. 5A is a diagram showing how an eccentricity vector for a geosynchronous orbit varies over time.

FIG. 5A is a diagram showing how the eccentricity vector 404 for a geosynchronous orbit varies over time in the absence of maneuvers. When viewed in an earth centered inertial frame, the effective direction of the solar perturbation forces appears to rotate round in a circle over the course of a year. This changing solar perturbation causes the circular eccentricity plot shown in FIG. 5A. Starting from an initial eccentricity of zero, solar perturbation forces in a first time interval result in an orbit with eccentricity 502. Over then next interval, solar forces combine to add an eccentricity vector change or delta eccentricity $\Delta e_{pert}$ 504 to the initial eccentricity vector $e_1$ 502, resulting in an eccentricity vector of $e_2$ 506. The eccentricity reaches a maximum at $e_{max}$ 508, and then becomes smaller, eventually returning to zero.

Figure 5B:
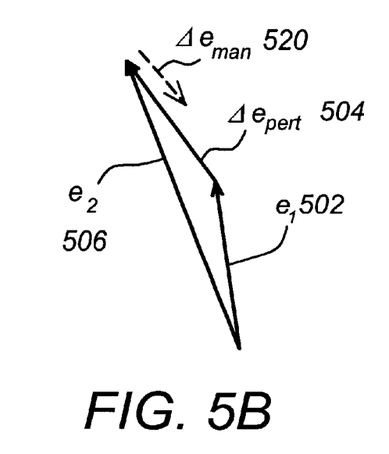
FIGS. 5B–5D are diagrams illustrating the effect of a control maneuver on the eccentricity vector.
Figure 5C:
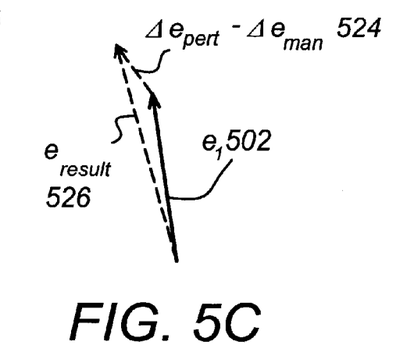
Figure 5D:
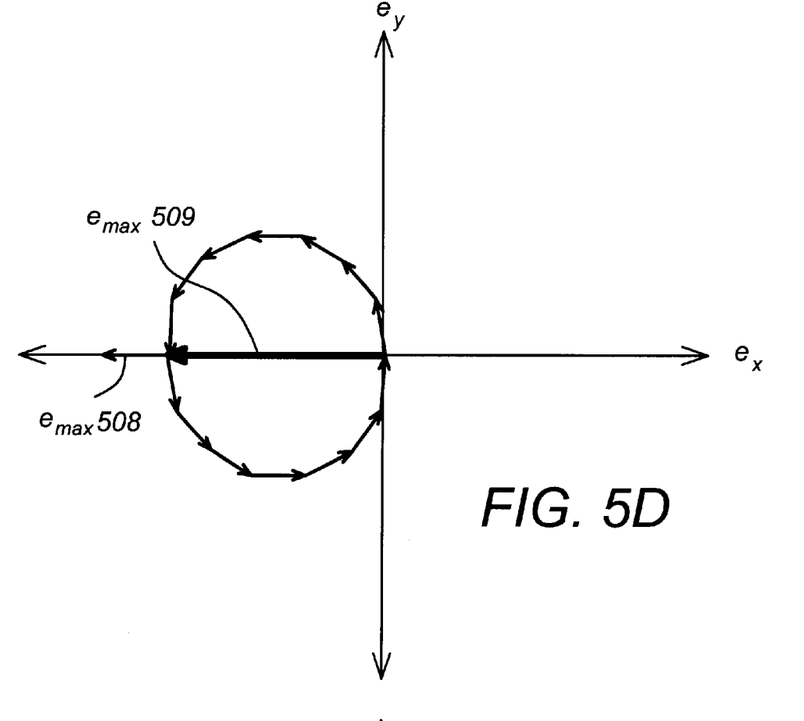

FIGS. 5B–5D are diagrams illustrating the effect of control maneuvers on the eccentricity vector. This example assumes that the magnitude of the control maneuver is that which is required to counter drift, that this maneuver is conducted at the point in the orbit where its direction will oppose the drift and the solar force, and that the magnitude of the drift control is too small to totally cancel the solar force effect.

FIG. 5B shows the vector summing of the eccentricity vector $e_1$ 502 and the perturbation $\Delta e_{pert}$ 504 to produce the eccentricity vector $e_2$ 506. FIG. 5C shows the eccentricity contribution ($\Delta e_{man}$) 520 from the application of a eccentricity control maneuver, and the impact on the eccentricity vector $e_{result}$ 526 (a vector sum of ($\Delta e_{pert} - \Delta e_{man}$) 524 and $e_1$ 502. Note that the impact of the eccentricity control maneuver is to reduce the radius of the eccentricity circle.

FIG. 5D is a diagram the illustrating the effect of such eccentricity control stationkeeping maneuvers on the eccentricity of a geosynchronous orbit. The peak eccentricity over a year for an orbit with zero initial eccentricity, subject to drift control maneuvers phased to opposes eccentricity growth, yet too small in magnitude to eliminate eccentricity growth is $e_{max}$ 509. Note that this is smaller than the peak growth without eccentricity control—$e_{max}$ 508 in FIG. SA. Note also that the eccentricity control maneuvers are effective in reducing the eccentricity of the orbit throughout the year. What is desired is to keep the maximum eccentricity as small as possible. This can be accomplished with the use of sun synchronous eccentricity control.

Figure 5E:
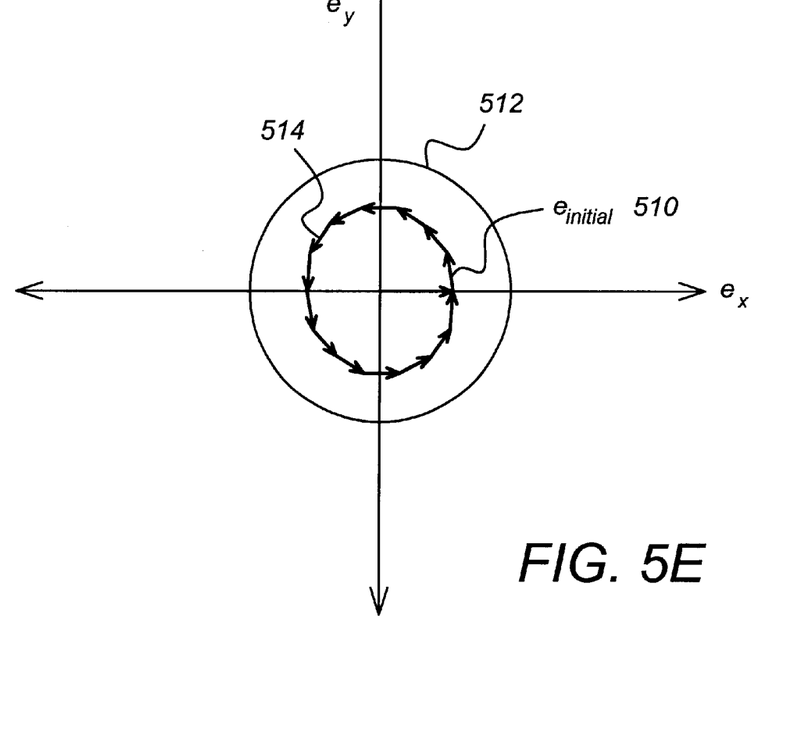
FIG. 5E is a diagram illustrating the sun-synchronous control strategy.

FIG. 5E is a diagram illustrating the sun synchronous eccentricity control strategy. Here, advantage is taken of the fact that the solar force eccentricity perturbation is not inertially fixed, but rotates with a period of one year. By initializing the eccentricity $e_{initial}$ 510 so that the perigee faces the sun (hence the term "sun facing perigee strategy"), the eccentricity vector rotates in inertial space once per year, with a nearly constant magnitude. Advantage is taken of the fuel required by drift control, to perform the tangential drift burn with a force vector towards the sun (for a given longitude, this will be at the same time of day—6 AM or 6 PM, depending on the sign of the triaxial term), thus compressing the eccentricity circle 514. Thig reduce; the average eccentricity value, and hence, the magnitude of the cast-west oscillation. Further details about the sun synchronous eccentricity control strategy can be found in section 6.2.3.2 of "An Introduction to Mission Design for Geostationaiy Satellites," by J. J. Pocha, which is hereby incorporated by reference herein.

Thus, the initial eccentricity $e_{initial}$ 510 is chosen so that the maximum eccentricity at any point in the plot remains within the maximum allowable eccentricity 512. The maximum eccentricity 512 is chosen so that when all the orbital perturbations are considered (including eccentricity), the satellite remains in its designated slot 108.

Even using the foregoing strategy, stationkeeping the spacecraft within the slot 108 can be problematic, and this is particularly true for satellites of low weight or with a high ratio of area to mass, such as a satellite with large solar arrays, because the orbits of such satellites are more severely impacted by solar force perturbations. Further, the circular nature of the annual eccentricity variation causes both components of eccentricity vector to consume equal stationkeeping resources. Further, "sun facing perigee" strategy results in an east-west longitudinal oscillation magnitude near the equatorial plane that is excessive at some periods of the year, requiring more frequent drift corrections or added fuel for direct eccentricity control.

The present invention solves this problem by using a stationkeeping method that controls one degree of freedom of the orbital eccentricity vector much more tightly than the other.

Figure 6:
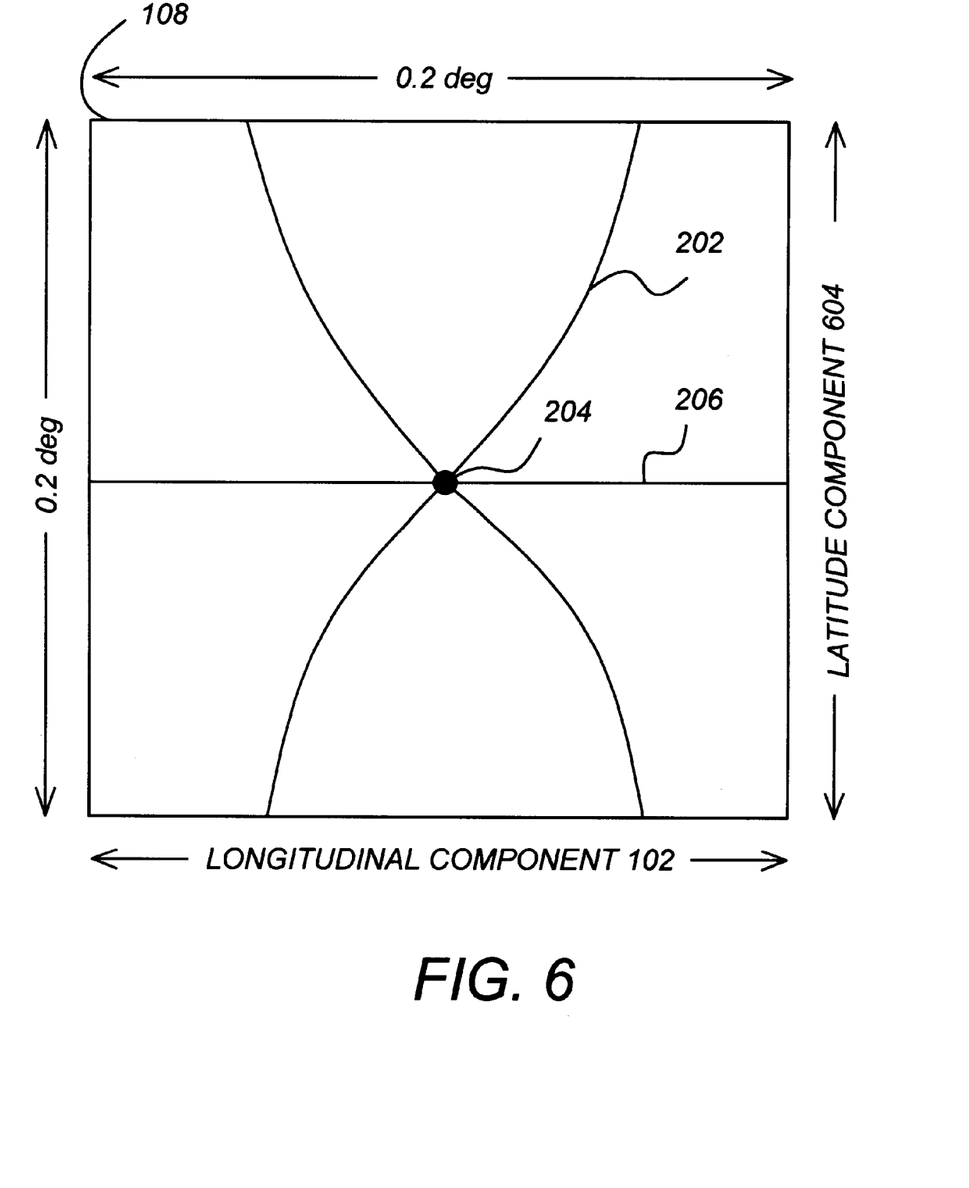
FIG. 6 is a diagram showing the relationship between a ground track of an inclined circular geosynchronous orbit and the slot.

FIG. 6 is a diagram showing the relationship between the ground track of an inclined circular geosynchronous orbit and the slot 108. Note that the ground track 202 for the inclined circular orbit 106B crosses the equatorial plane 206 at zero. Hence, in the absence of orbital perturbations, the fact that the orbit is inclined contributes no error in positioning the satellite within its slot 108 when the satellite crosses the equatorial plane.

For geostationary (near-equatorial geosynchronous orbit) spacecraft, the longitudinal component 602 of the orbit perturbations must be maintained inside the slot 108 throughout the day (from the greatest Northern excursion to the greatest Southern excursion and back) to ensure no risk of communication interference with adjacent spacecraft. This means that the absolute value of the orbital eccentricity must be minimized to limit its contribution to the longitudinal component 602 of any errors. This can be achieved using the sun-facing perigee strategy discussed above with respect to FIGS. 5A–5E.

However, for spacecraft in inclined geosynchronous orbits, a significant portion of their daily ground track 202 is spent at latitudes greater than 0.1 degrees North or 0.1 degrees south. While at these latitudes, longitudinal excursion of the satellites is not restricted in the same manner as at the equatorial plane. In fact, such a restriction would be impossible to meet for orbits with inclinations above about 4.8 degrees, even in the absence of any orbital perturbations.

Hence, it is beneficial to perform stationkeeping maneuvers so that the satellite remains within its assigned slot 108 near the equatorial plane, but is allowed to vary from its nominal orbit at other times. The present invention achieves this result by using a stationkeeping method in which one degree of freedom of the orbital eccentricity is more tightly controlled than the other. This results in a system which can require less fuel to maintain a given east-west tolerance near the equatorial plane, and for spacecraft with thrusters on only one of its cast-west faces, allows a given equatorial longitude tolerance to be met with fewer drift control maneuvers, or, in certain cases, to be met at all.

Figure 7A:
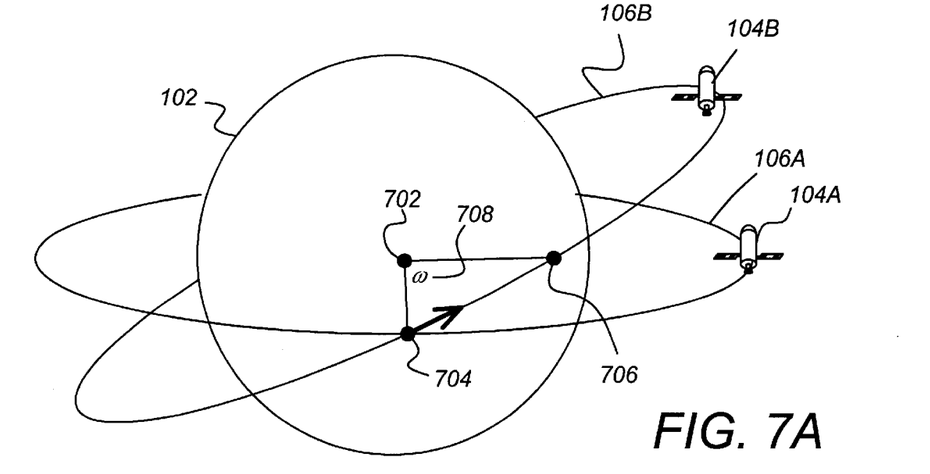
FIGS. 7A and 7B is a diagram showing a view of a spacecraft in an inclined geosynchronous orbit.
Figure 7B:
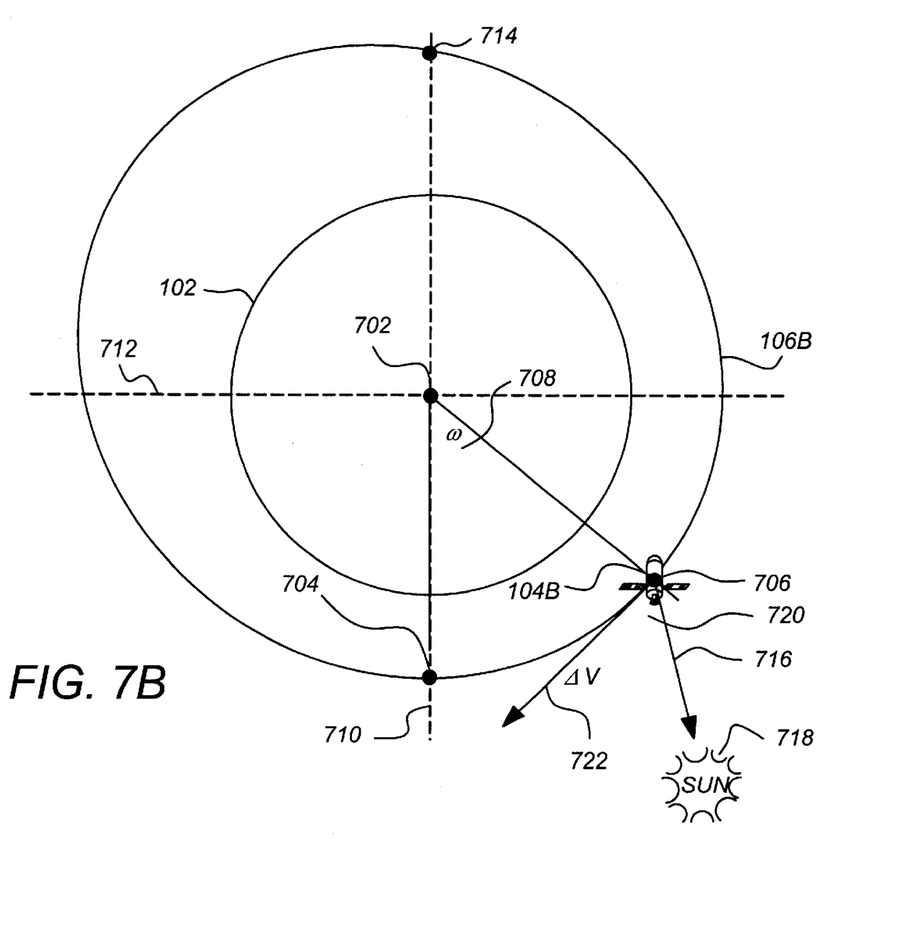

FIGS. 7A and 7B are diagrams showing a view of a spacecraft 104B in an inclined geosynchronous orbit 106B. The contribution of the orbital eccentricity at the equatorial plane is a function of the absolute value of the eccentricity and the argument of perigee of the orbit (the argument of perigee is an angle 708 described by the earth center 702, the ascending node 704 (the crossing of the orbit from South to North) and the perigee position 706). Specifically, ignoring second order parameters, the contribution is described by equation (1) below:

$$|2e \cdot \sin(\omega)| \tag{1}$$

Therefore, to minimize equation (1) we minimize the value of $2e \cdot \sin(\omega)$, (rather than simply the eccentricity $e$ as in prior art methods).

For moderately inclined geosynchronous orbits, the rate of change in the ascending node 704 is relatively slow (a maximum of about one degree per month and much slower at the beginning and end of satellite life). Hence, the inertial position of the ascending node remains fairly constant. This slowly varying value for the ascending node allows the orbital location for eccentricity control maneuvers ($\Delta e_{man}$) to be conveniently described as being near the intersection of the orbit 106B and the "line of antinodes" 712 (the "line of antinodes" is a line passing through the two antinodes of the orbit and perpendicularly to the line of nodes 710 passing through the ascending node 704 and the descending node 714). The line of antinodes can also be defined as a line drawn through points where the orbital excursions in the northern and southern latitude directions are at a maximum.

In one embodiment of the present invention, the maneuver direction and time is such that an angle 720 between an in orbital plane component of the control maneuver $\Delta V$ 722 and an in-orbital plane component of a line 716 projected from the satellite to the sun 718 is at least 30 degrees.

Figure 8:
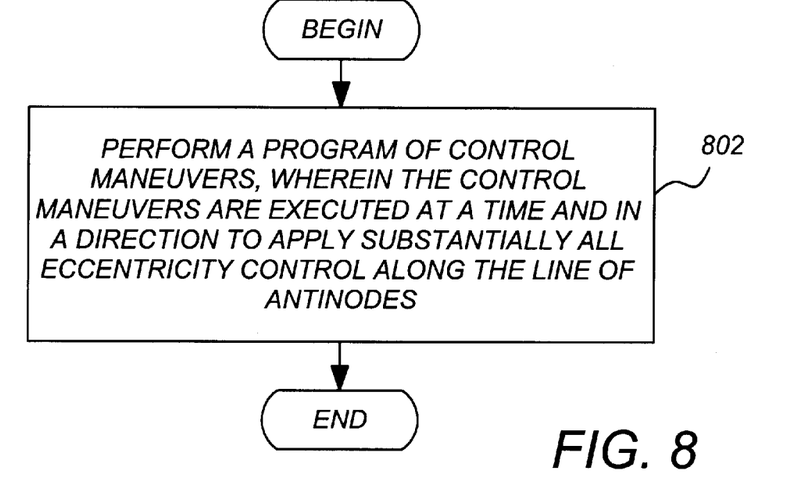
FIG. 8 is a flow chart illustrating the method step used to perform satellite stationkeeping in accordance with one embodiment of the present invention.

FIG. 8 is a flow diagram illustrating the method step used to perform satellite stationkeeping in accordance with the present invention. As illustrated, this is accomplished by performing a program of control maneuvers at times and in directions to apply substantially all eccentricity control along the line of antinodes 712. This is illustrated in block 802. In one embodiment of the invention, the foregoing control maneuvers to minimize eccentricity are performed in an amount required in order to minimize orbital drift, especially from triaxial drift sources. Since drift maneuvers can be performed at any time, the foregoing scheme reduces the amount of fuel required to remain in the slot 108. In another embodiment of the invention, at least a portion of the eccentricity control $\Delta e_{man}$ is applied to oppose at least part of the eccentricity perturbations ($\Delta e_{pert}$) that occur between successive control maneuvers. Since the Sun accounts for most of the eccentricity perturbations, this embodiment typically results in a control maneuver substantially opposing the solar force eccentricity perturbation ($\Delta e_{sun}$).

Figure 9:
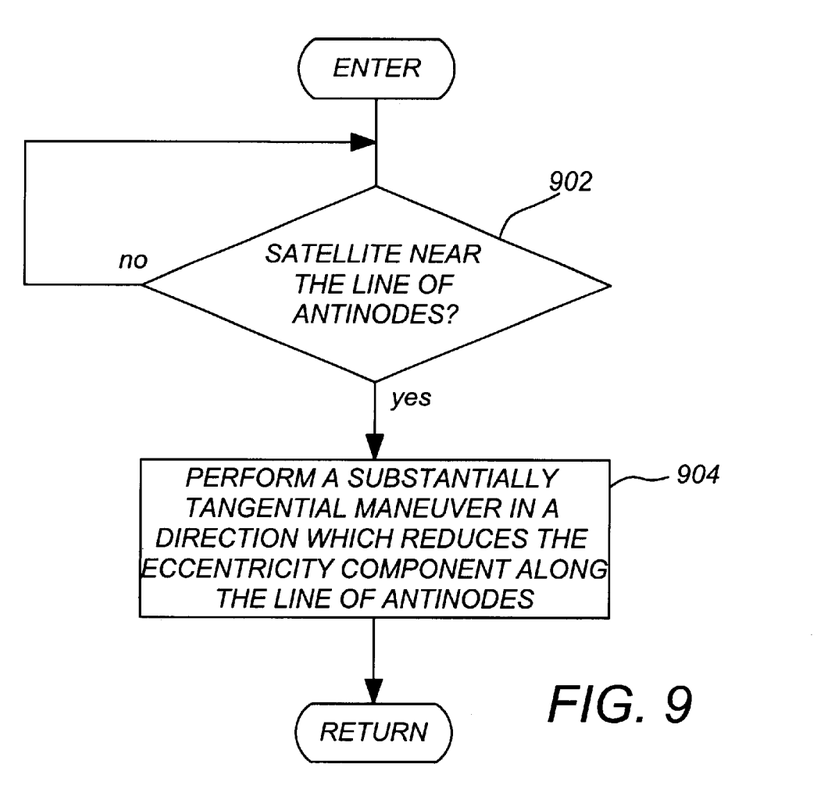
FIG. 9 is a flow chart showing another embodiment of the present invention in which the eccentricity control maneuver is performed by directing an impulse in a direction tangential to the satellite orbit.

FIG. 9 is a flow chart showing another embodiment of the present invention in which the drift compensation maneuver is performed by directing an impulse in a direction tangential to the satellite orbit 104B. These "tangential burns" are typically much more efficient in terms of fuel consumption, since the $\Delta V$ impulses effect greater changes in the orbit of the satellite. In this embodiment, the tangential maneuver is performed when the satellite is near (and preferably at) the line of antinodes 712.

A stable control scheme using the above strategy to minimize the equatorial contribution of eccentricity throughout the yearly cycle (in which the solar force rotates the perigee one revolution) is accomplished by applying the eccentricity change for a given maneuver (or pair/set of maneuvers) in a direction opposing the component of the solar force perturbation along the line of antinodes 710. This results in a maneuver at a local time of day (as measured from the Sun) that varies throughout the year according to a six month cycle. In one example, the first of a series of control maneuvers is performed at 6 AM local time, the timing of the next maneuver over the next three months clocks over to midnight, then flips to noon, then, over the following three months, clocks to 6 AM again. When the maneuver time is near noon or midnight, the eccentricity control $\Delta e_{man}$ available will often be greater than the solar force perturbation $\Delta e_{sun}$ in the direction of concern. This results in four local off-nodal-axis eccentricity maxima; each occurring shortly before and after the perigee direction passes through the line of antinodes 710.

Figure 10:
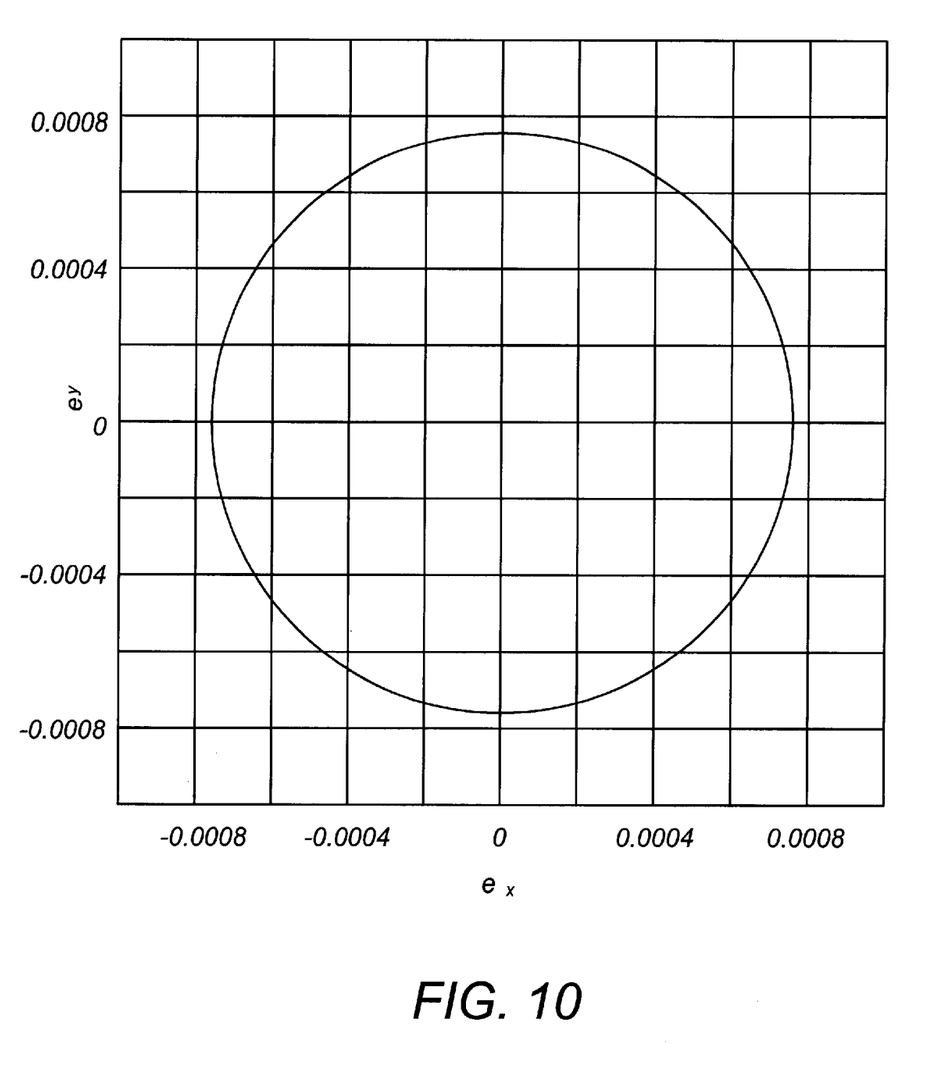
FIG. 10 is a plot of the eccentricity for an exemplary spacecraft in an inclined geosynchronous orbit without eccentricity control.

FIG. 10 is a plot of the eccentricity for an exemplary spacecraft whose sole eccentricity control is to initialize the orbit eccentricity so as to minimize the maximum eccentricity throughout the year. In FIG. 10, the $e_x$ axis represents $e_{node}$ and $e_y$ represents $e_{antinode}$.

Figure 11:
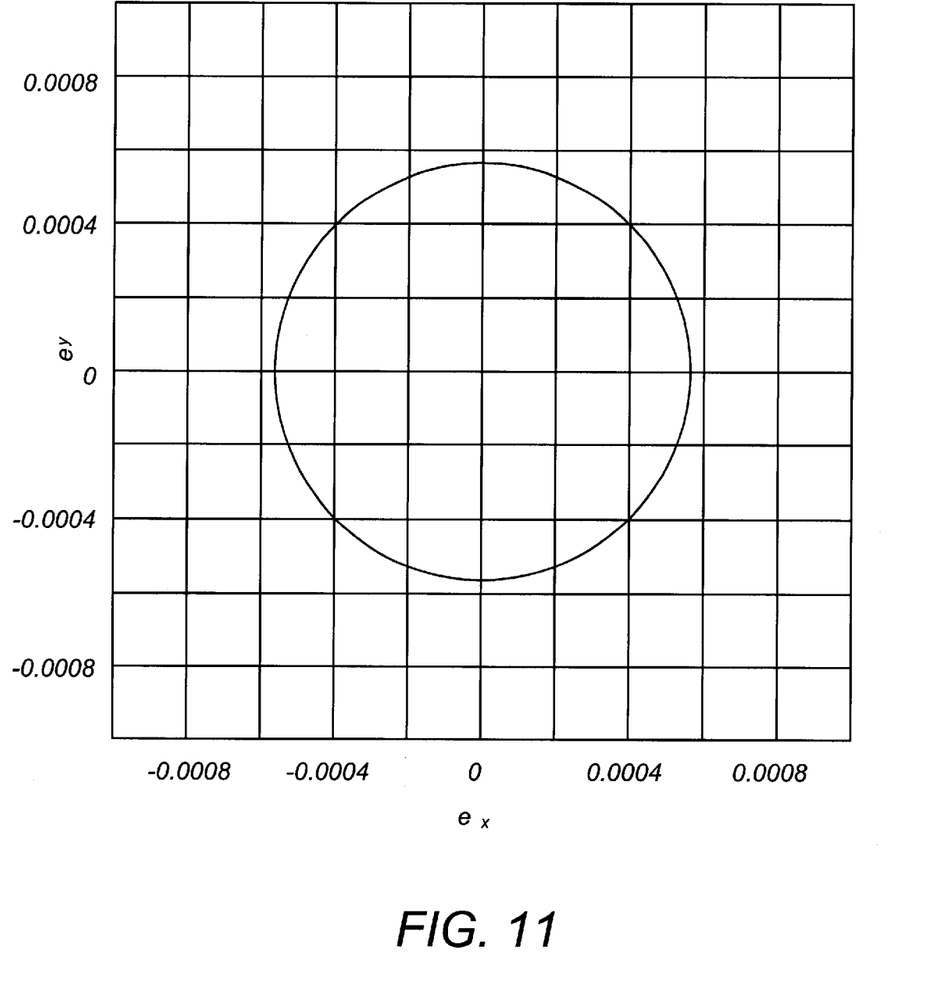
FIG. 11 is a plot showing the impact of a Sun-facing perigee eccentricity control strategy on the orbital eccentricity characteristics shown in FIG. 10.

FIG. 11 is a plot showing the impact of a Sun-facing perigee eccentricity control strategy on the orbital eccentricity characteristics shown in FIG. 10.

Figure 12:
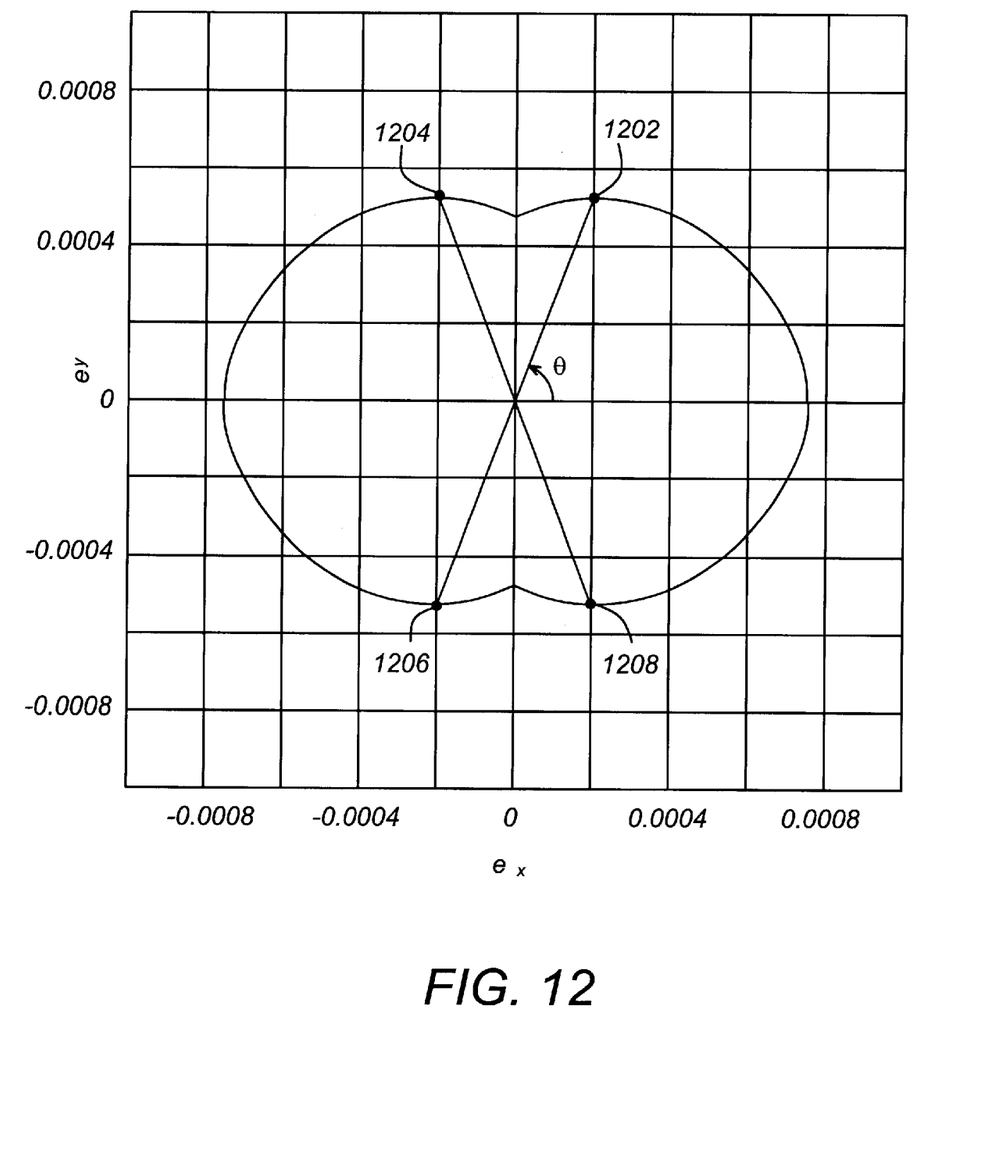
FIG. 12 is a plot showing the impact of the eccentricity control strategy of the present invention on the orbital eccentricity characteristics.

FIG. 12 is a plot showing the impact of the eccentricity control strategy of the present invention on the orbital eccentricity characteristics. As described above, to keep the satellite in its assigned slot 108, the value of the eccentricity vector along the antinode (y-axis) is of primary importance, and is therefore minimized. As illustrated in FIG. 10, the eccentricity vector magnitude remains constant at about 0.000752 and rotates in direction during the annual cycle. Hence, the maximum off axis eccentricity (in the y-direction) is about 0.000752. With the Sun-facing perigee strategy, the eccentricity vector magnitude remains constant at about 0.000575, and rotates in direction during the annual cycle. Hence, the maximum off-axis eccentricity (eccentricity in the direction of interest) is about 0.000575. Using the technique described above, the eccentricity varies during the year between about 0.000752 to 0.000475, but the component that contributes to equatorial longitude excursion (the off-axis eccentricity in the y-direction) is reduced to a maximum of about 0.000495. Hence, the foregoing technique increases the effective control exerted on off-nodal-axis eccentricity from 0.000177 to 0.000257, a 45% increase in effectiveness for no additional fuel or operational cost.

The foregoing is based in part on a simplified, constant solar force model, no other perturbations impacting orbital eccentricity, a constant node (inertially time invariant location of the ascending node), and no constraints on the timing or duration of the maneuver. In practice, in-plane solar force will vary with the earth's orbital eccentricity and the Sun's declination relative to the orbital plane, and there are additional eccentricity perturbations from solar and lunar gravity. However, the effect of these perturbations can be described both analytically and empirically, and the principles set forth above can be used to derive an eccentricity control scheme that takes these factors into account. For example, the principles described above can be adapted to a numerically derived eccentricity profile of the satellite 104.

As described above, the eccentricity profile illustrated in FIG. 12 includes four local maxima 1202, 1204, 1206, and 1208 of $e_y$. For the illustrative examples shown in FIGS. 10–12, each of the periods between successive maxima 1202, 1204 and 1206, 1208 are approximately four weeks. Modified eccentricity control maneuver strategies (different maneuver timing or direction) can be applied during this interval so long as such maneuvers do not increase the off-axis eccentricity beyond the maximum value. For example, as the inertial position of the ascending node 704 is slowly varying, maneuvers can be performed during this period to realign the eccentricity pattern such that the maximum eccentricity lies along the average orbital line of nodes (for the next 6 months, until the next reinitialization opportunity between maxima 1206 and 1208, This node retargeting technique permits the satellite 104 to use no additional fuel to react to the slowly varying ascending node 704 position over a typical operational life. Maxima 1202 can be defined from the argument of perigee θ as:

$$\theta = \cos^{-1}\left(\frac{\Delta e_{man}}{\Delta e_{pert}}\right) \quad (2)$$

wherein $\Delta e_{man}$ is the control maneuver's effect on orbital eccentricity, and $\Delta e_{pert}$ is the effect of perturbations (such as those from solar effects) on the orbital eccentricity. Hence, the foregoing maneuvers can be performed when the argument of perigee $\theta$ is:

$$\cos^{-1}\left(\frac{\Delta e_{man}}{\Delta e_{pert}}\right) \leq \theta < 180 - \cos^{-1}\left(\frac{\Delta e_{man}}{\Delta e_{pert}}\right) \quad (3)$$

and $$180 + \cos^{-1}\left(\frac{\Delta e_{man}}{\Delta e_{pert}}\right) \leq \theta < 360 - \cos^{-1}\left(\frac{\Delta e_{man}}{\Delta e_{pert}}\right) \quad (4)$$

degrees.

It is also possible that a specific implementation of the invention may include other constraints on maneuver timing and/or direction, often due to eclipse or solar array impingement considerations. Both of these constraints can be adapted to the foregoing strategy. If the maneuver duration is considered (instead of the idealized instantaneous maneuver described above), the maneuver should be performed so that the averaged maneuver should be in the direction and at the time specified above. Such a maneuver, is less efficient than the idealized maneuver, but the overall increase in maneuver efficiency is comparable to that described with regard to the ideal case above (where a 45% efficiency increase was obtained). In the event that maneuvers are constrained to exclude certain times of day ("stayout zones"), the maneuvers may be performed as close as possible to the ideal time, beginning at the start of the stayout zone until the end becomes preferable. Although this may decrease the efficiency of the eccentricity control scheme, efficiency gains will still be realized.

Conclusion

This concludes the description of the preferred embodiments of the present invention. In summary, the present invention describes a method for controlling the eccentricity of an orbit.

One embodiment of the present invention is described by a method comprising the step of performing a program of eccentricity control maneuvers wherein the control maneuvers are executed at times and in directions selected to apply substantially all eccentricity control along a line of antinodes. In one embodiment, the control maneuvers are tangential maneuvers, and each control maneuver is applied near the line of antinodes. Provision is made for performing additional maneuvers, including node retargeting maneuvers during specified intervals. Another embodiment of the invention is described by a satellite in a substantially geosynchronous orbit having a satellite control system with a processor implementing instructions to perform control maneuvers as described above. Yet another embodiment of the present invention is described by a command facility comprising a processor for implementing instructions to perform the program control maneuvers described above, and a communicatively coupled transmitter for transmitting the commands to the satellite.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of controlling an eccentricity of a satellite orbit characterizable by a line of antinodes, comprising the step of:

performing a program of control maneuvers wherein the control maneuvers are executed at times and in directions selected to apply substantially all eccentricity control ($\Delta e_{man}$) along the line of antinodes such that an argument of perigee of the satellite orbit during the at least one year changes by greater than 180 degrees if the program of control maneuvers are performed for at least one year.

2. The method of claim 1, wherein the direction of the control maneuvers is such that the eccentricity control ($\Delta e_{man}$) resulting from the control maneuvers substantially oppose an eccentricity perturbation ($\Delta e_{pert}$) at least in part between successive control maneuvers.

3. The method of claim 2, wherein the eccentricity perturbation ($\Delta e_{pert}$) is a solar force eccentricity perturbation ($\Delta e_{sum}$).

4. The method of claim 1, wherein an applied impulse of at least one of the control maneuver is substantially tangential to the orbit and wherein the control maneuver is applied near the line of antinodes.

5. The method of claim 1, wherein the orbit is further characterized by an orbital drift, and the control maneuvers are performed in an amount to control the orbital drift.

6. The method of claim 1, wherein the orbit is further characterizable by an argument of perigee, and the method further comprises the steps of:

performing node retargeting maneuvers when the argument of perigee is between $\cos^{-1}(\Delta e_{man}/\Delta e_{pert})$ and $180-\cos^{-1}(\Delta e_{man}/\Delta e_{pert})$ degrees.

7. The method of claim 1, wherein the orbit is further characterizable by an argument of perigee, and the method further comprises the steps of:

performing node retargeting maneuvers when the argument of perigee is between $180+\cos^{-1}(\Delta e_{man}/\Delta e_{pert})$ and $360-\cos^{-1}(\Delta e_{man}/\Delta e_{pert})$ degrees.

8. The method of claim 1, wherein the orbit is further characterizable by an argument of perigee, and the method further comprises the steps of:

performing modified control maneuvers when the argument of perigee is between $\cos^{-1}(\Delta e_{man}/\Delta e_{pert})$ and $180-\cos^{-1}(\Delta e_{man}/\Delta e_{pert})$ degrees.

9. The method of claim 1, wherein the orbit is further characterizable by an argument of perigee, and the method further comprises the steps of:

performing modified control maneuvers when the argument of perigee is between $180+\cos^{-1}(\Delta e_{man}/\Delta e_{pert})$ and $360-\cos^{-1}(\Delta e_{man}/\Delta e_{pert})$ degrees.

10. The method of claim 1, wherein the orbit is further characterizable by an argument of perigee, and the method further comprises the steps of:

performing additional maneuvers when the argument of perigee is between $\cos^{-1}(\Delta e_{man}/\Delta e_{pert})$ and $180-\cos^{-1}(\Delta e_{man}/\Delta e_{pert})$ degrees.

11. The method of claim 1, wherein the orbit is further characterizable by an argument of perigee, and the method further comprises the steps of:
   performing additional maneuvers when the argument of perigee is between $180+\cos^{-1}(\Delta e_{man}/\Delta e_{pert})$ and $360-\cos^{-1}(\Delta e_{man}/\Delta e_{pert})$ degrees.

12. The method of claim 1, wherein the satellite orbit is a geosynchronous orbit.

13. The method of claim 1, wherein the satellite orbit is inclined between approximately three and seven degrees.

14. The method of claim 1, wherein the control maneuvers are executed at times and in directions selected to maintain the eccentricity of the satellite orbit to less than 0.003.

15. A method of performing maneuvers to reduce a drift of an orbit while simultaneously controlling an eccentricity of the orbit, comprising the step of:
   performing a program of control maneuvers to control drift at tunes and in directions to apply substantially all eccentricity control ($\Delta e_{man}$) along the line of antinodes such that an argument of perigee of the satellite orbit during the at least one year changes by greater than 180 degrees if the program of control maneuvers are performed for at least one year.

16. A satellite in a substantially geosynchronous orbit characterizable by a line of antinodes, comprising:
   a satellite control system having a processor and a plurality of thrusters, wherein the processor implements instructions commanding the thrusters to perform a program of control maneuvers at times and in directions to apply substantially all eccentricity control ($\Delta e_{man}$) along the line of antinodes such that an argument of perigee of the satellite orbit during the at least one year changes by greater than 180 degrees if the program of control maneuvers are performed for at least one year.

17. The apparatus of claim 16, wherein the direction of the control maneuvers are such that the eccentricity control ($\Delta e_{man}$) resulting from the control maneuvers substantially oppose an eccentricity perturbation ($\Delta e_{pert}$) at least in part between successive control maneuvers.

18. The apparatus of claim 16, wherein an applied impulse of at least one of the control maneuvers is substantially tangential to the orbit and wherein the control maneuver is applied near the line of antinodes.

19. The apparatus of claim 16, wherein the orbit is further characterized by an orbital drift, and the control maneuvers are performed in an amount to control the orbital drift.

20. The apparatus of claim 16, wherein the orbit is further characterizable by an argument of perigee, wherein the processor further implements instructions to command the thrusters to perform node retargeting maneuvers when the argument of perigee is between $\cos^{-1}(\Delta e_{man}/\Delta e_{pert})$ and $180-\cos^{-1}(\Delta e_{man}/\Delta e_{pert})$ degrees.

21. The apparatus of claim 16, wherein the orbit is further characterizable by an argument of perigee, wherein the processor further implements instructions to command the thrusters to perform node retargeting maneuvers when the argument of perigee is between $180+\cos^{-1}(\Delta e_{man}/\Delta e_{pert})$ and $360-\cos^{-1}(\Delta e_{man}/\Delta e_{pert})$ degrees.

22. A command facility for providing stationkeeping commands to a satellite in a substantially geosynchronous orbit characterizable by a line of antinodes, comprising:
   a processor implementing instructions to generate commands to perform a program of satellite control maneuvers at times and in directions to apply substantially all eccentricity control ($\Delta e_{man}$) along the line of antinodes such that an argument of perigee of the satellite orbit during the at least one year changes by greater than 180 degrees if the program of control maneuvers are performed for at least one year; and
   a transmitter, communicatively coupled to the processor to transmit the command to the satellite.

23. A method of controlling an eccentricity of a satellite orbit characterizable by a line of antinodes while simultaneously controlling an eccentricity of the orbit, comprising the step of:
   performing a program of control maneuvers at a time and in a direction to apply substantially all eccentricity control ($\Delta e_{man}$) along the line of antinodes; and
   wherein an angle between an in-orbital plane component of the control maneuver and an in-orbital plane component of a line projected from the satellite to the sun is at least 30 degrees.

* * * * *